United States Patent [19]

Takasaki

[11] 4,320,527

[45] Mar. 16, 1982

[54] BIT SYNCHRONIZING SYSTEM FOR PULSE SIGNAL TRANSMISSION

[75] Inventor: Yoshitaka Takasaki, Tokorozawa, Japan

[73] Assignee: Hitachi, Ltd., Tokyo, Japan

[21] Appl. No.: 66,643

[22] Filed: Aug. 15, 1979

[30] Foreign Application Priority Data

Aug. 18, 1978 [JP] Japan .................. 53-112456[U]
Sep. 4, 1978 [JP] Japan .................. 53-107501

[51] Int. Cl.³ .................. H03B 3/04; H03K 5/00
[52] U.S. Cl. .................. 375/119; 307/273; 328/140
[58] Field of Search .............. 375/106, 119, 120, 113; 324/78 Z; 307/269, 273; 328/140, 155, 55, 138; 329/106

[56] References Cited

U.S. PATENT DOCUMENTS

| | | | |
|---|---|---|---|
| 3,271,688 | 9/1966 | Oschwind et al. ............ | 375/113 |
| 3,646,452 | 2/1972 | Horowitz et al. ............ | 328/155 |
| 3,755,748 | 8/1973 | Carlow et al. .............. | 375/106 |
| 3,778,550 | 12/1973 | David et al. ............... | 375/119 |
| 3,934,205 | 1/1976 | Bogert ...................... | 375/119 |
| 3,952,254 | 4/1976 | Kurita et al. .............. | 375/119 |
| 3,982,194 | 9/1976 | Chi et al. .................. | 328/155 |
| 3,999,136 | 12/1976 | O'Berry et al. ............. | 328/138 |
| 4,027,274 | 5/1977 | Fukui et al. ............... | 375/120 |
| 4,055,814 | 10/1977 | Abraham et al. ............. | 375/120 |
| 4,066,978 | 1/1978 | Cox, Jr. et al. ............ | 328/155 |
| 4,085,288 | 4/1978 | Viswanathan ................. | 375/120 |
| 4,166,249 | 8/1979 | Lynch ....................... | 328/55 |
| 4,207,539 | 6/1980 | Minakuchi .................. | 307/273 |

Primary Examiner—Donald J. Yusko
Attorney, Agent, or Firm—Craig and Antonelli

[57] ABSTRACT

A bit synchronizing system for generating a timing signal corresponding to a transmitted pulse signal is disclosed in which the transmitted pulse signal is converted into a signal in which the number of pulses successively assuming the same polarity is limited to permit detection of frequency, the converted signal is integrated, a peak of integrated values is detected, the output of a voltage-controlled clock generator for generating the timing signal is processed in a similar manner to detect a peak with respect to the output, and the clock generator is controlled by a voltage corresponding to a difference between these two peaks, whereby the frequency of clock signal coincides with the bit rate of the transmitted pulse signal.

6 Claims, 11 Drawing Figures

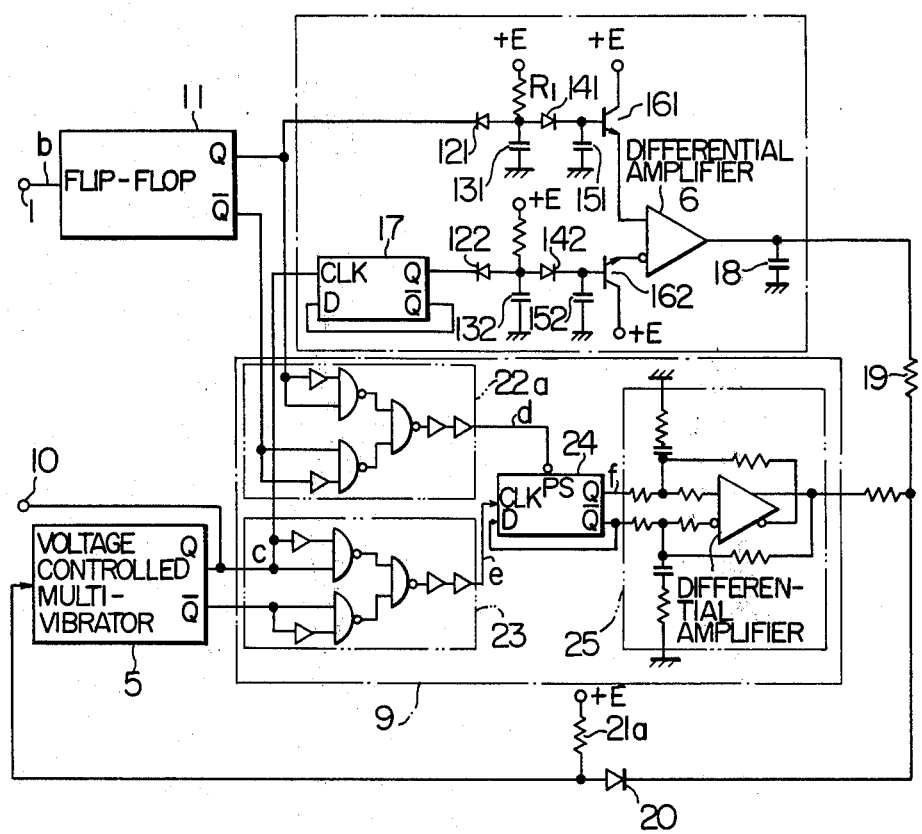
F I G. 3

FIG. 8
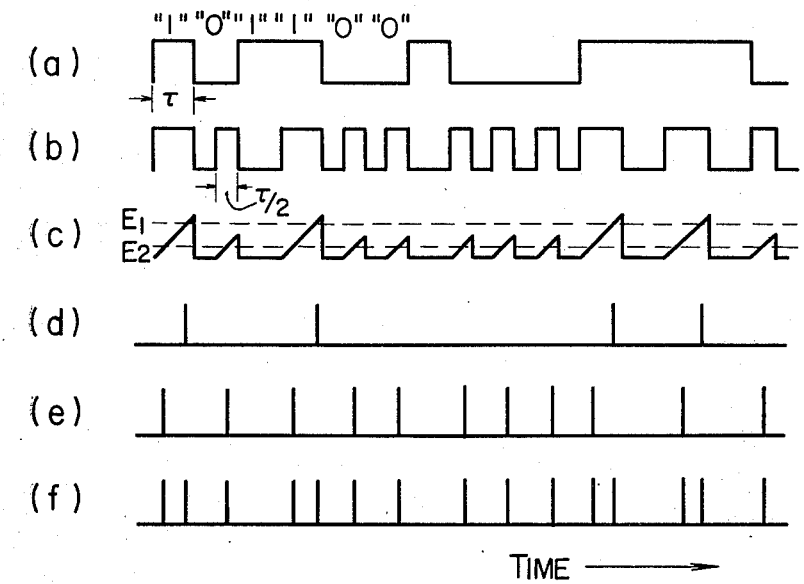
FIG. 9
FIG. 10
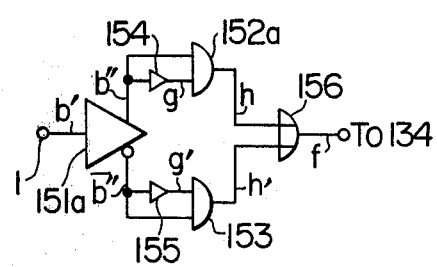
FIG. 11
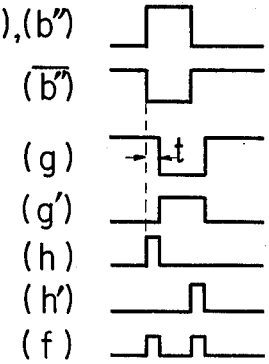

BIT SYNCHRONIZING SYSTEM FOR PULSE SIGNAL TRANSMISSION

The present invention relates to a timing signal extraction system for pulse signal transmission, and more particularly to a system for extraction of a timing signal necessary to demodulate or regenerate a received pulse train.

An advantage of pulse signal transmission resides, of course, in that a received pulse train can be regenerated in a repeating or receiving installation in a waveform nearly equal to an original one without being affected by noise. It is necessary for the above regeneration to produce a timing signal for retiming, and two kinds of timing signal producing systems are well known, one of which is a system in which the transmitted pulse train contains a synchronizing signal, and the other is the self-timing system in which a fundamental frequency of the transmitted pulse train is detected and an oscillator is driven with the detected fundamental frequency to generate a timing signal. Although the self-timing system is generally simple in construction as compared with the former system, the oscillation frequency of the oscillator for generating the timing signal is previously specified so as to agree with the fundamental frequency of the transmitted pulse train, and therefore only a pulse train having a constant bit rate can be transmitted with this system. For a case where the bit rate of the transmitted pulse train is varied, or for wide-band signal transmission such as found in recently developed optical communication systems, investigation is made on a system in which only the equilization and reshaping are conducted in the course of transmission with the retiming being left undone. However, such a system cannot make use of the conventional self-timing system as it is, and requires the manual adjustment of resonance frequency on the receiver's side, with inconvenience in operation.

A prime object of the present invention is to provide a bit synchronizing system for pulse signal transmission in which the correct retiming may be effected for a transmitted pulse signal of any period (or bit rate), namely, a bit synchronizing system in which the timing of a timing signal generator incorporated in a receiver may automatically follow the period of the transmitted pulse signal for any variation in timing of the pulse signal.

In order to attain the above object, according to the present invention, there is provided a self-timing system for comparing the frequency of a voltage-controlled clock generator with the frequency of an input pulse signal to detect a difference frequency and for controlling the clock generator by the detected difference frequency to deliver a timing signal from the clock generator, wherein a transmitted pulse signal is converted into a restricted code to be subsequently converted into a voltage or transition number proportional to the frequency of the restricted code, wherein the voltage or transition number of the restricted code converted is compared with that of an output signal of the clock generator to produce a difference signal, and wherein the clock generator is controlled with the difference signal thereby to produce the timing signal output. In more detail, a code such as specifying the greatest of numbers in which the level (or polarity) of "1" or "0" can be consecutively assumed, can be employed as the restricted code. In this case, an integrated waveform obtained by integrating the converted signal (or code) for a period corresponding to the greatest number in which the same level (or polarity) can continue, has a constant relationship to that obtained by integrating the clock signal, in their peak values. That is, when the frequency of the converted signal is coincident with the clock frequency, a relative value (or difference) between respective peak values of these integrated waveforms can be made constant, or can be made equal to zero. In a case where the above-mentioned two frequencies are different from each other, a voltage (or current) having one or the other polarity can be detected according to which one of these frequencies is higher or lower than the other frequency. The frequency of the clock signal can be made equal to that of the input (or transmitted) pulse signal by controlling a voltage-controlled oscillator by the above-mentioned difference signal. When coincidence is obtained between the frequency of the input pulse signal and that of the clock signal, the synchronization with respect to phase can be readily obtained with a conventional phase-locked-loop which is incorporated in the self-timing system. Thus, there can be provided a clock signal which is perfectly synchronized with the input pulse train, namely, the desired timing signal.

Further, a code having a transition number proportional to a pulse repetition frequency can be employed as the restricted code. In this case, the frequency of the clock pulse can be controlled by merely counting the number of transitions in a coded pulse train and comparing the counted number with the frequency of the clock signal generator, and therefore a simplified circuit can be employed.

The foregoing and other objects, features and advantages of the present invention will become more apparent from the following explanation in conjunction with the accompanying drawings in which:

FIGS. 1, 3 and 6 are block diagrams of respective circuit arrangements of three different embodiments of a bit synchronizing system according to the present invention;

FIGS. 7 and 10 are circuit diagrams of different circuit arrangements suited to the transition detector 32 or 34 of the embodiment shown in FIG. 6;

FIG. 8 is a waveform chart for explaining the operation of the embodiment shown in FIG. 6;

FIG. 9 is a waveform chart for explaining an example of restricted codes; and

FIG. 11 is a time chart for explaining the operation of the circuit arrangement shown in FIG. 10.

Figure 1:
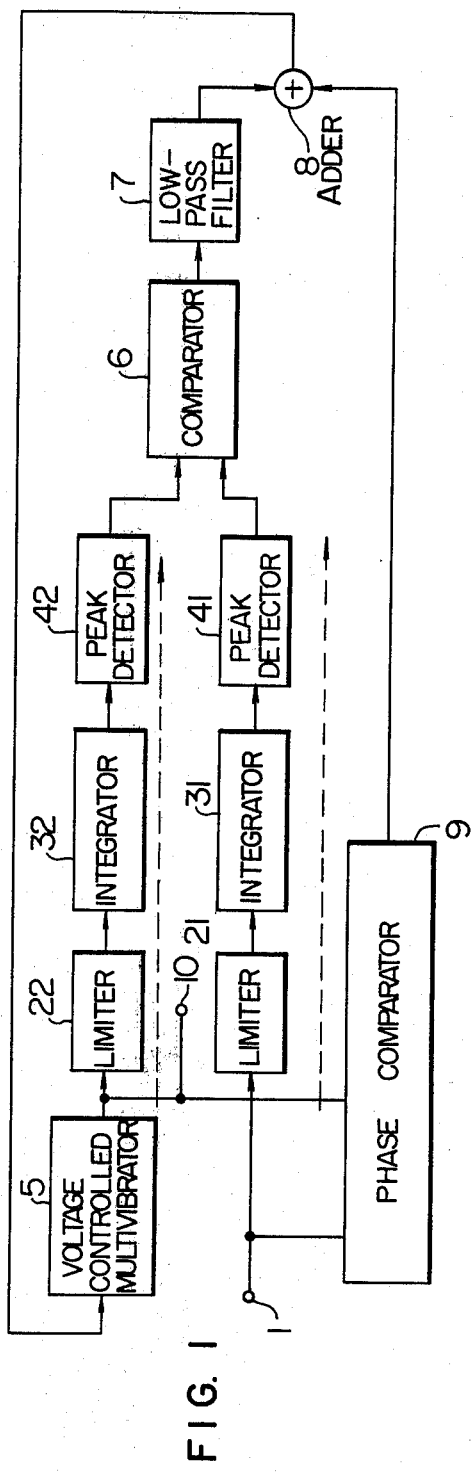
Figure 2:
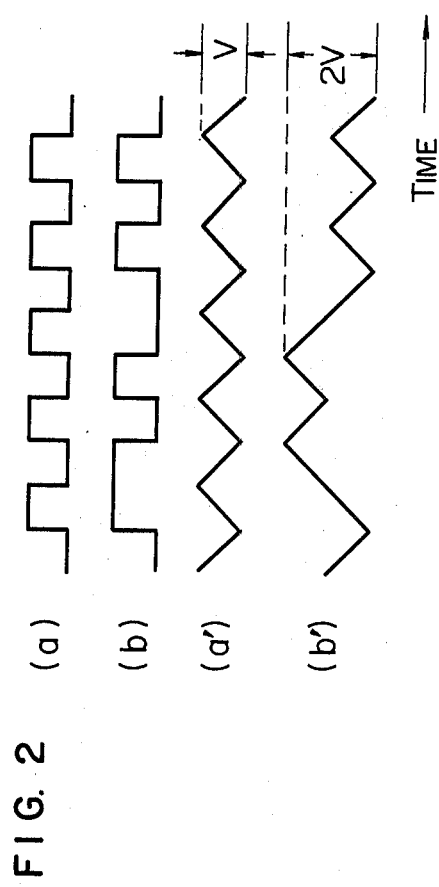
FIG. 2 is a waveform chart for explaining the operation of the embodiment shown in FIG. 1.

FIG. 1 shows a circuit arrangement of an embodiment of a bit synchronizing system according to the present invention, and FIG. 2 shows signal waveforms for explaining the operation of the embodiment shown in FIG. 1. Referring to FIGS. 1 and 2, an input terminal 1 is supplied with an input signal (b) coded by a restricted code. The input signal, namely, the signal (b) which is transmitted and retimed with this embodiment, is an NRZ (non-return-to-zero) pulse signal, as shown in FIG. 2. In more detail, the greatest of numbers in which input pulses can consecutively assume the same polarity is restricted, (the greatest number in which pulses can assume in succession the polarity of "1", is equal to 2 for the input signal (b) shown in FIG. 2), and the mean value of the input pulses is equal to zero because of an excellent dc-balance of the input signal.

The input pulse signal (b) is shaped by a limiter 21 into a square-wave signal (note that the signal (b) shown in FIG. 2 has been already shaped into the square-wave signal. The output signal of the limiter 21 is integrated by an integrator 31, as indicated by a waveform (b') of FIG. 2. The peak value of the integrated waveform (b') becomes constant (that is, becomes equal to 2V), since the input pulse signal is coded by the restricted code, that is, the greatest number in which pulses can assume in succession the same polarity of "1" or "0" is restricted to, for example, 2 in the signal (b), and since the input pulse signal is well dc-balanced. The output of the integrator 31 is applied to a peak detector 41 thereby to be converted into a signal corresponding to the above-mentioned peak value. Reference numeral 5 indicates a voltage controlled multivibrator whose frequency is controlled by an applied voltage. A part of the output of the multivibrator 5 is applied to a limiter 22, an integrator 32, and a peak detector 42, in the order described. These elements 22, 32 and 42 have the same characteristic and operation as the elements 21, 31 and 41, correspondingly and respectively. Waveforms (a) and (a') shown in FIG. 2 indicate the output waveforms of the limiter 22 and the integrator 32, respectively. The outputs of the peak detectors 41 and 42 are applied to a comparator 6, the output of which is applied through a low-pass filter 7 to an adder 8.

When the frequency of the input pulse signal is equal to that of the multivibrator 5, the amplitude of the output of the peak detector 41 becomes twice as large as that of the peak detector 42 due to the above-mentioned code for the input pulse signal (b), (note that the above amplitude is inversely proportional to frequency). Accordingly, the frequency of the multivibrator 5 can be made equal to that of the input pulse signal by comparing the above-mentioned two amplitudes and adjusting the frequency of the multivibrator 5 so as to make a ratio of these amplitudes equal to 2. In the case where the frequency of the multivibrator 5 differs from that of the input pulse signal, a voltage corresponding to the difference between these frequencies is applied to the multivibrator 5 through the low-pass filter 7 and the adder 8 thereby to control the frequency of the multivibrator 5. When these frequencies become equal to each other, the above control signal disappears which has been sent through the comparator 6, filter 7 and adder 8 to the multivibrator 5. However, in the case where the output of the multivibrator 5 differs only in phase from the input pulse signal, it is impossible to control the phase of the multivibrator 5 with only the above-mentioned circuit construction, and therefore a different loop for phase control is provided. That is, a part of the output signal of the multivibrator 5 and the input pulse signal are both applied to a phase comparator 9 which delivers a voltage signal corresponding to a difference in phase between these applied signals. The voltage signal is applied through the adder 8 to the multivibrator 5 thereby to control the phase thereof. Through the operation of such a phase control loop and that of the previously-mentioned frequency control loop, which are coupled with each other, the frequency and phase of the multivibrator 5 are synchronized with those of the input pulse signal, the output signal of the multivibrator 5 at a time when synchronization in both frequency and phase is attained, forms the timing signal, aand is taken out of the terminal 10. Since the construction and operation of a conventional phase control loop suitable for use in the above-mentioned phase control loop are well known, the explanation thereof is omitted.

Figure 4:
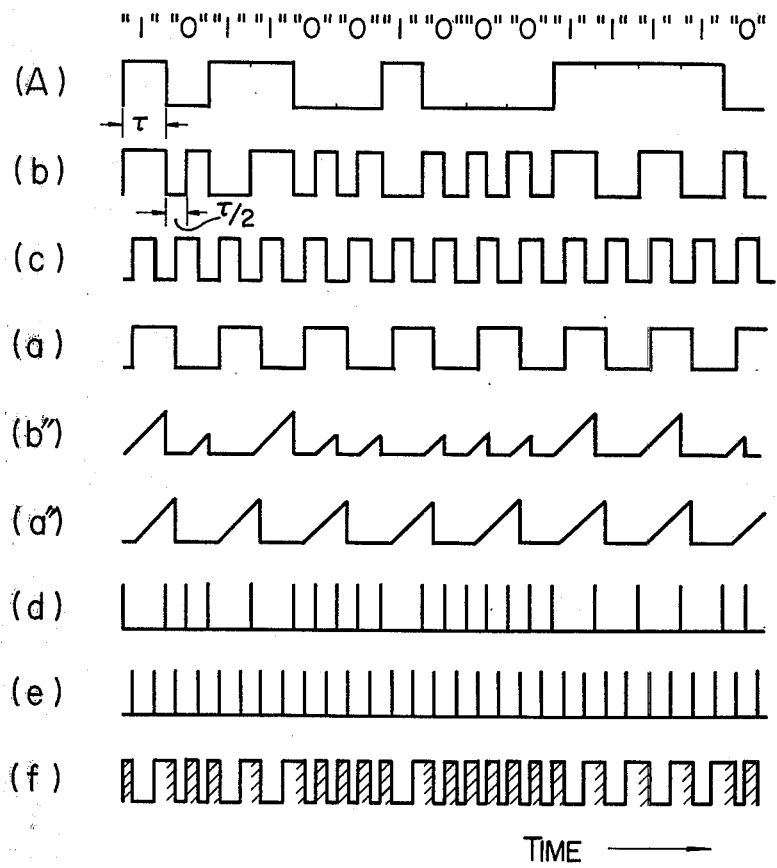
FIG. 4 is a time chart for explaining the operation of the embodiment shown in FIG. 3.

FIG. 3 shows another embodiment of a bit synchronizing system according to the present invention, and FIG. 4 is a time chart for explaining the operation of the above embodiment. Referring to FIGS. 3 and 4, an input terminal 1 is supplied with an input signal (b) shown in FIG. 4, which is coded by a restricted code. In more detail, an original pulse code signal (A) shown in FIG. 4 is converted into the signal (b) in accordance with the following rule. That is, original pulses of "1" are alternately converted into a pulse of "1" or "0" which has the same time slot duration $\tau$ as the original pulse, the original pulse of "0" is converted into a combination of a pulse of "1" and a pulse of "0" each having a time slot duration of $\tau/2$ or into a combination of the pulses "0" and "1" in this order, and the converted pulse signal (b) includes a pulse of "1" and a pulse of "0" in an alternate fashion.

Reference numeral 11 in FIG. 3 indicates a circuit for separating pulses of one polarity in the input pulse signal (b) from pulses of the other polarity. A part of the input pulse signal (b), namely, the pulses of one (or positive) polarity are integrated by an integrator made up of a diode 121 and a capacitor 131, as shown by a waveform (b") of FIG. 4. Strictly speaking, the integrator has an exponential integration characteristic. However, since the above exponential characteristic can be approximated to a linear characteristic, the integration characteristic in the waveform (b") is indicated by a straight line for brevity's sake. When each of the pulses of "1" terminates, discharge is conducted through the diode 121 to permit rapid fall of voltage, as is shown in the waveform (b"). The output of the integrator is applied to a peak detector made up of a diode 141 and a capacitor 151, and the potential of the capacitor 151 is increased to reach a peak value. The peak value is maintained unchanged during a predetermined period of time since the discharge of the capacitor 151 is prevented by the action of the diode 141 during a period of time when the pulse of "1" is absent. The peak value thus maintained is applied through a transistor 161 to the positive terminal of a differential amplifier 6 which forms a comparator.

On the other hand, a part of the output signal (c) of a voltage-controlled multivibrator 5 is applied to a delay flip flop circuit 17 thereby to be converted into a signal (a) having a frequency equal to one half of the frequency of the signal (c). The output signal (a) of the circuit 17 is applied to a negative terminal of the differential amplifier 6 through an integrator made up of a diode 122 and a capacitor 132, a peak detector made up of a diode 142 and a capacitor 152, and a transitor 162. These elements 122, 132, 142, 152 and 162 have the same structure and operation as the above-mentioned elements 121, 131, 141, 151 and 161, respectively. The output of the differential amplifier (or the comparator) is filtered by a capacitor 18, and then applied to the multivibrator 5. A diode 20 and a resistor 21a make up a circuit for shifting the voltage level. The above-mentioned curcuit arrangement performs the same operation as has been explained in connection with FIG. 1. That is, when the period of a pulse train delivered from the multivibrator 5 is equal to that of the input pulse signal, the output of the differential amplifier 6 (or comparator) becomes zero. When these two periods differ from each other, either a positive or a negative voltage is applied to the multivibrator 5 until the periods coincide with each other, according to which one of the periods is greater or smaller than the other period.

Reference numeral 9 denotes a phase locked loop (PLL), which is provided to make the phase of the pulse train delivered from the multivibrator equal to that of the input pulse signal, since there are many cases where the pulse train from the multivibrator 5 is coincident in frequency but incongruous in phase with the input pulse signal. In the phase locked loop 9, reference numeral 22a indicates a zero-crossing detector which delivers one pulse in the output (d) thereof every time the input pulse signal (b) is inverted in polarity, and 23a is a zero-crossing detector which delivers one pulse in the output (e) thereof every time the output signal (c) of the multivibrator 5 is inverted in polarity. The output signals (d) and (e) of these two zero-crossing detectors are applied to a delay flip flop circuit 24 in such a manner that the signal (d) presets the circuit 24 and the signal (e) inverts a set state. The flip flop circuit 24 delivers an output signal (f) shown in FIG. 4. In the output signal (f), those portions which are indicated by oblique lines, contribute to control of the multivibrator 5, and the remaining portions serve only to make the d.c. component of the output signal equal to zero because of deficiency of zero-crossing in the input pulse signal. The output of the flip flop circuit 24 is applied as a phase control signal to the voltage-controlled multivibrator 5 through a low-pass filter 25 thereby to control the multivibrator 5. Since the construction of the above-mentioned phase locked loop is known, a further explanation thereof is omitted. The output signal (c) of the multivibrator 5 which is controlled through the above-mentioned operation, is taken out of the terminal 10, and employed as a timing signal is a regenerator (not shown) of the input pulse signal, which can be formed with a well-known circuit construction.

In the foregoing embodiments, an input pulse signal is subjected to a restricted coding that only two pulses can successively assume the same polarity. However, it is evident that the present invention is not limited to such embodiments.

Figure 5:
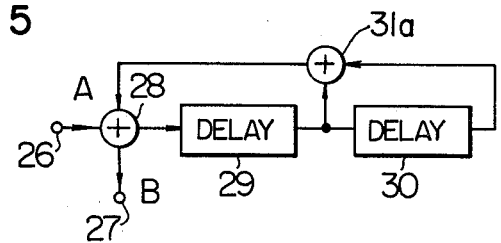
FIG. 5 is a circuit diagram showing a scrambler usable in the embodiments shown in FIGS. 1, 3 and 6.

In the case where a considerable number of pulses successively assume the polarity of "0" in the original pulse signal (A), peaks of a low-value successively appear on the output signal (b″) of the peak detector, and there are some instances where the detector fails to detect the low peaks properly. In such a case, it is effective to apply scrambling to the original signal (A). That is, an original signal A is applied to, for example, a circuit shown in FIG. 5 which includes adders 28 and 31a and delay elements 29 and 30 each having a delay time τ, and the output signal of the above circuit is then converted into the signal (b). When, for example, a signal "10000", which is a part of the original signal A, is applied to an input terminal 26, a signal "11100" is delivered as an output signal B from an output terminal 27. That is, there appear many peaks of a high value on the signal (b″), and thus the above-mentioned problem can be solved. Since a method for restoring a scrambled signal to an original signal on the receiver's side is well known, the explanation thereof is omitted.

As has been explained hereinbefore, according to the above-mentioned embodiments of the present invention, even when the pulse repetition period of an input pulse signal is varied, if the greatest of numbers in which pulses can successively assume the same polarity is known, the bit synchronizing control may be effected in the operation range of the controlled multivibrator by additionally providing a circuit for generating the pulse train with a period corresponding to the greatest number.

Further, in a bit synchronizing system according to the present invention, an input pulse signal is subjected to a restricted coding which provides an excellent dc-balance, a different between two frequencies is detected based upon the dc-balance, and therefore any frequency within a wide frequency range can be pulled in a desired frequency.

Figure 6:
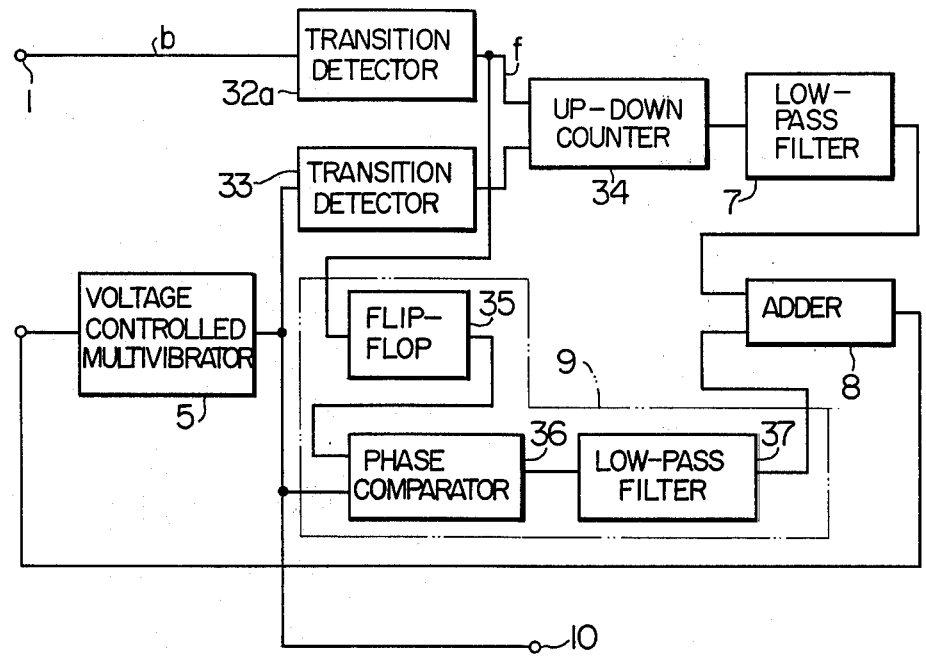

FIG. 6 shows a further embodiment of a bit synchronizing system according to the present invention. In FIG. 6, reference numeral 1 denotes an input terminal, 10 an output terminal, 32a a transition detector for an input signal, 33 a transition detector for the output pulses of a voltage-controlled multivibrator 5 (or a clock signal generator), 34 an up-down counter which forms a comparator and delivers either a positive or a negative voltage according to whether the frequency of the input pulse signal is higher or lower than that of the output pulses of the multivibrator 5, and 7 a low-pass filter. The output of the low-pass filter 7 is applied to the voltage-controlled multivibrator 5 through an adder 8 to control the multivibrator 5. When the frequency of the input signal is coincident with that of the multivibrator 5, the output of the low-pass filter 7 becomes zero, which indicates that synchronization has been achieved. Then, the output of the multivibrator 5 is applied as a timing signal to a regenerator (not shown) of the input pulse signal.

Further, in FIG. 6, a flip flop circuit 35, a phase comparator 36 and a low-pass filter 37 make up a well-known phase locked loop (PLL) for controlling the phase.

Now, explanation will be made of the case where the input terminal 1 is supplied with an input pulse signal (b) as shown in FIG. 8. The input pulse signal (b) is obtained by converting a binary signal (a) as shown in FIG. 8 in accordance with a predetermined rule. That is, states of "1" in the binary signal (a) are alternately converted into the state of "1" or "0", states of "0" in the signal (a) are converted into a combination of the state of "0" and the state of "1" or a combination of the state of "1" and the state of "0", the time slot duration of each of those states of "1" and "0" into which the state of "0" in the signal (a) is converted, is made equal to one half of the time slot duration of each of individual states in the signal (a), and the state of "1" and the state of "0" are alternately generated in the pulse signal (b).

Figure 7:
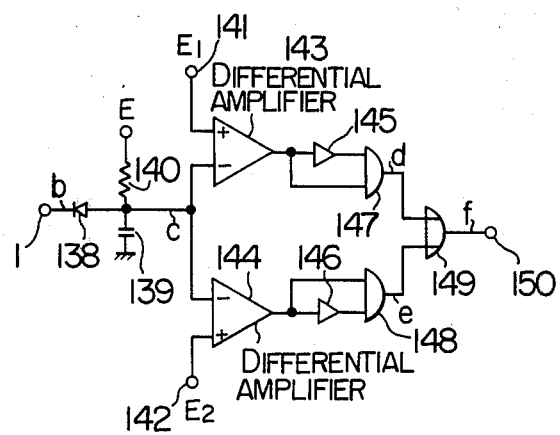

FIG. 7 shows a circuit arrangement of each of of the transition detectors 32a and 33. Referring to FIGS. 7 and 8, the input pulse signal (b) applied to the input terminal 1 is integrated by an integrating circuit which includes a diode 138, a power source E, a resistor 140 and a capacitor 139. The output signal (c) of the integrating circuit is applied to respective negative terminals of differential amplifiers 143 and 144 to be compared with those bias voltages $E_1$ and $E_2$ which are applied to respective positive terminals of the differential amplifiers 143 and 144. The output of the differential amplifier 143 is applied to an AND circuit 147 directly and through an inverting delay element 145, and the output of the differential amplifier 144 is applied to an AND circuit 148 directly and through an inverting delay element 146. The AND circuit 147 delivers a pulse (d) when the voltage of the integrated signal (c) becomes equal to the bias voltage $E_1$, and the AND circuit 148 delivers a pulse (e) when the signal (c) reaches the level of the bias voltage $E_2$. These pulse signals (d) and (e) are combined with each other by an OR circuit 149 to form a signal (f) at an output terminal 150.

The transition detector 33 is similar in construction to the circuit shown in FIG. 7, but can be formed with a more simplified construction. The detector 33 delivers continuous pulses having a constant period $\tau$, which correspond to the output signal (f) of the transition detector 32a. The outputs of the transition detectors 32a and 33 are applied to the up-down counter 34 in such manner that the output pulse of the detector 32a increases the count of the counter 34 and the output pulse of the detector 33 decreases the count of the counter 34. When the frequency of the input pulse signal is equal to that of the multivibrator 5, the count of the up-down counter 34 is kept constant during a predetermined period of time. In more detail, the output pulse of the detector 32a corresponding to the "0" state of the signal (a) has the same period as the output signal of the multivibrator 5, and the number of pulses which are delivered from the detector 32a in correspondence to the "1" state of the signal (a) is two or zero in one time slot duration. Since the case where two pulses are delivered and the case where no pulse is delivered, are alternately generated, the output pulses of the detector 32a corresponding to the "1" state of the signal (a) have a mean period equal to the period of the multivibrator.

The up-down counter 34 delivers either a positive or a negative voltage according to whether the number of pulses delivered from the detector 32a is larger or smaller than the number of pulses delivered from the detector 33. The output of the up-down counter 34 is applied through the low-pass filter 7 to the multivibrator 5 thereby to control the oscillation frequency thereof.

FIG. 9 shows an example of different pulse transmission signals in which an original signal (a'), which is a return-to-zero (RZ) signal, is converted into an input pulse signal (b') in such a manner that the transition in the signal (b') takes place at the end of the time slot for the "1" state of the original signal (a') a and at the center of the time slot for the "0" state.

FIG. 10 shows a circuit arrangement of the transition detectors 32a and 33 in the case where the input pulse signal (b') shown in FIG. 9 is applied to the circuit shown in FIG. 6, and FIG. 11 is a waveform chart for explaining the operation of the circuit shown in FIG. 10. The input pulse signal (b') is applied to a circuit 151a which can deliver an output signal (b") of the same polarity as the input signal (b') and another output signal ($\overline{b''}$) of inverted polarity. The signal (b") is applied to an AND circuit 152a directly and through an inverting delay element 154 having a delay time t, and a pulse (h) having a pulse duration t is thereby delivered from the AND circuit 152a. Similarly, the signal ($\overline{b''}$) is applied to an AND circuit 153 directly and through a similar inverting delay element 155, and a pulse (h') having a pulse duration t is delivered from the AND circuit 153. These output pulses (h) and (h') are combined with each other by an OR circuit 156 thereby to generate an output signal (f). Accordingly, when the input pulse signal (b') having such a waveform as shown in FIG. 9 is applied to the transition detector 32a having the circuit arrangement shown in FIG. 10, the output pulse (h) or (h') is delivered from the detector at each of the transition points ①, ②, ③, ④, ⑤ and ⑥ of the input pulse signal (b'), that is, one output pulse is delivered in one time slot duration. Therefore, by counting the number of the output pulses (h) and (h'), namely, the number of pulses appearing on the output signal (f), the frequency of the input pulse signal can be detected. The transition detector 33 has entirely the same construction as the detector 32a, and therefore delivers one pulse in each time slot of a signal applied to the detector 33. The output pulses of the detector 32a and those of the detector 33 are applied to the counter 34 which forms a comparator. As previously explained in connection with FIG. 6, the output of the counter 34 is applied to the multivibrator 5 thereby to control the oscillation frequency of the multivibrator and thereby to make the oscillation frequency of the multivibrator equal to the frequency of the input pulse signal, and the output of the multivibrator is taken out of the output terminal 10 to be used as the timing signal. The transission detector shown in FIG. 10 has an advantage that the detector can be made up of only digital circuits without employing integrators, when compared with the detector shown in FIG. 7.

As has been explained above, according to this embodiment of the present invention, an input pulse signal is subjected to such a predetermined restriction that a transition in each time slot of the input pulse signal can be readily detected, the number of transitions in the input pulse signal is compared with that in the output of voltage-controlled oscillator, and the result of the comparison is applied to the oscillator to make the oscillation frequency of the oscillator (namely, the frequency of a timing signal) equal to the frequency of the input pulse signal. Accordingly, even when the frequency of the input pulse signal is varied to a great degree, the desired timing signal can be generated without any manual adjustment.

What is claimed is:

1. A bit synchronizing system for a pulse signal transmission comprising:
    an input terminal to which a transmitted pulse signal is applied, said pulse signal being coded by a restricted code whose pulse repetition frequency is detectable;
    a clock signal generator, the output frequency thereof being variable in response to a voltage applied thereto;
    a first circuit for converting said pulse signal from the input terminal into a signal proportional to the frequency of said pulse signal from the input terminal;
    a second circuit for converting the output pulse of said clock signal generator into a signal proportional to the frequency of said output pulse of said clock signal generator;
    a comparing circuit for generating a signal corresponding to the difference between respective outputs of said first and second circuits;
    means for controlling the frequency of said clock signal generator by means of the output of said comparing circuit; and
    means for taking out the output of said clock signal generator as a timing signal.

2. A bit synchronizing system according to claim 1, wherein said transmitted pulse signal is a signal in which the number of pulses successively assuming the same polarity is limited, and wherein each of said first and second circuits include a circuit for integrating an input pulse and for detecting a maximum value obtained by said integration to obtain signals proportional to the frequencies.

3. A bit synchronizing system according to claim 2, wherein said transmitted pulse signal, in which the number of pulses successively assuming the same polarity is limited, is a dc-balanced signal.

4. A bit synchronizing system according to claim 2, wherein said transmitted pulse signal, in which the number of pulses successively assuming the same polarity is limited, has a waveform such that a code pulse of the polarity of "1" or "0" having a predetermined pulse width is generated for each of the states of "1" in said transmitted pulse signal in such a manner that said code pulse of the polarity of "1" and said code pulse of the polarity of "0" are alternately generated, a combination of a code pulse of the polarity of "1" and a code pulse of the polarity of "0" each having a pulse width equal to one-half of said predetermined pulse width is generated for each of the states of "0" in said transmitted pulse signal, and all code pulses are arranged in such a manner that a code pulse of the polarity of "1" and a code pulse of the polarity of "0" alternately appear.

5. A bit synchronizing system according to claim 2, wherein said transmitted pulse signal, in which the number of pulses successively assuming the same polarity is limited, has a waveform such that a code pulse of the polarity of "1" or "0" having a predetermined pulse width is generated for each of the states of "0" in said transmitted pulse signal in such a manner that said code pulse of the polarity of "1" and said code pulse of the polarity of "0" are alternately generated, a combination of a code pulse of the polarity of "1" and a code pulse of the polarity of "0" each having a pulse width equal to one-half of said predetermined pulse width is generated for each of the states of "1" in said transmitted pulse signal, and all code pulses are arranged in such a manner that a code pulse of the polarity of "1" and a code pulse of the polarity of "0" alternately appear.

6. A bit synchronizing system according to claim 1, wherein each of said first and second circuits includes a circuit for detecting transitions contained in an input pulse and a circuit for counting said detected transitions, and wherein said comparing circuit compares a counted value of transitions outputted from said first circuit with a counted value of transitions outputted from said second circuit.

* * * * *